ID 1

(12) United States Patent
Wolfin et al.

(10) Patent No.: US 11,461,469 B2
(45) Date of Patent: Oct. 4, 2022

(54) CONTAINER ANOMALY DETECTION BASED ON CROWD SOURCING

(71) Applicant: Microsoft Technology Licensing, LLC, Redmond, WA (US)

(72) Inventors: Nadav Wolfin, Redmond, WA (US); Moshe Israel, Redmond, WA (US); Liran Englender, Redmond, WA (US); Benyamin Farshteindiker, Redmond, WA (US); Elizabeta Mash Levin, Redmond, WA (US); Lior Becker, Redmond, WA (US); Josef Weizman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 848 days.

(21) Appl. No.: 16/253,402

(22) Filed: Jan. 22, 2019

(65) Prior Publication Data

US 2020/0233961 A1   Jul. 23, 2020

(51) Int. Cl.
| G06F 21/00 | (2013.01) |
| G06F 21/56 | (2013.01) |
| G06F 11/30 | (2006.01) |
| G06F 11/34 | (2006.01) |
| G06F 21/53 | (2013.01) |

(52) U.S. Cl.
CPC .......... *G06F 21/566* (2013.01); *G06F 11/301* (2013.01); *G06F 11/302* (2013.01); *G06F 11/3495* (2013.01); *G06F 21/53* (2013.01); *G06F 2221/033* (2013.01)

(58) Field of Classification Search
CPC .... G06F 21/566; G06F 11/301; G06F 11/302; G06F 11/3495; G06F 21/53; G06F 2221/033
See application file for complete search history.

(56) References Cited

U.S. PATENT DOCUMENTS

| 10,824,726 | B1* | 11/2020 | Herman Saffar ... G06F 11/3466 |
| 2017/0116412 | A1 | 4/2017 | Stopel et al. |
| 2018/0144123 | A1* | 5/2018 | Levin .................. G06F 21/52 |
| 2018/0260574 | A1* | 9/2018 | Morello ............. G06F 9/44505 |
| 2018/0278639 | A1* | 9/2018 | Bernstein ............ G06F 21/577 |

FOREIGN PATENT DOCUMENTS

GB   2550178 A   11/2017

OTHER PUBLICATIONS

"International Search Report and Written Opinion Issued in PCT Application No. PCT/US2019/067642", dated Mar. 13, 2020, 24 Pages.

* cited by examiner

*Primary Examiner* — Ghazal B Shehni
(74) *Attorney, Agent, or Firm* — Schwegman Lundberg & Woessner, P.A.

(57) ABSTRACT

Generally discussed herein are devices, systems, and methods for secure container operation. A behavior profile of normal container operation can be generated, such as by using crowd sourced data. A container monitor can provide container actions of an application in a deployed container. The container action can be compared to a behavior profile that indicates normal behavior of the container. A communication can in response to the container actions being inconsistent with the normal behavior of the behavior profile. The container can be halted to stop the abnormal behavior.

20 Claims, 6 Drawing Sheets

CONTAINER ANOMALY DETECTION BASED ON CROWD SOURCING

BACKGROUND

A container is a deployed instance of a container image. A developer generates a container image that includes all the resources required for an application to operate in the container. The container is then deployed and a user can access the functionality of the application within the container.

More and more organizations are using containers for their application deployments. Containers provide a faster deployment process, easier maintenance, and easier development as compared to other application deployments, such as virtual machines (VMs). Containers can lower costs by reducing maintenance and compute resources required to operate and maintain the containers. Malicious parties who are familiar with this trend to use containers are trying to use these containers as a new attack vector. These malicious parties are looking for ways to exploit these container resources for their malicious ends.

SUMMARY

This summary section is provided to introduce aspects of embodiments in a simplified form, with further explanation of the aspects of embodiments following in the detailed description. This summary section is not intended to identify essential or required features of the claimed subject matter, and the combination and order of elements listed in this summary section are not intended to provide limitation to the elements of the claimed subject matter.

Generally discussed herein are devices, systems, machine-readable mediums, and methods for secure container operation. A behavior profile of normal container operation can be generated, such as by using crowd sourced data. A container monitor can provide container actions of an application in a deployed container. The container action can be compared to a behavior profile that indicates normal behavior of the container. A communication can be issued in response to the container actions being inconsistent with the normal behavior of the behavior profile. The container can be halted to stop the abnormal behavior.

A system for secure container operation can include comprising processing circuitry and a memory device coupled to a processor, the memory device including instructions stored thereon for execution by the processing circuitry to perform operations for container monitoring. The operations can include receiving, from a container monitor, container actions of an application operating in a deployed container. The operations can include comparing the container actions to a behavior profile that indicates normal behavior of the container. The operations can include issuing a communication in response to the container actions being inconsistent with the normal behavior of the behavior profile or halting the container.

The behavior profile includes data indicating a port number of a port accessed by an application within the container or a process called by an application in the container. The container actions can indicate a port number of a port accessed by the application in the container or a process called by an application in the container. The behavior profile includes data indicating an action performed by an application of the container and a percentage indicating a number of containers built from a same container image that exhibit the behavior.

The operations can further include filtering container actions associated with container action types that are not in the behavior profile before comparing the container actions to the behavior profile. Comparing the container actions to the behavior profile includes generating a feature vector based on the container actions and generating, using a machine learning classifier trained on normal container actions, a label indicating whether the application in the container is operating inconsistent with the normal container actions based on the feature vector.

DETAILED DESCRIPTION

In the following description, reference is made to the accompanying drawings that form a part hereof. The drawings show, by way of illustration, specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or methods described herein may be implemented in software in some embodiments. The software may include computer executable instructions stored on computer or other machine-readable media or storage device, such as one or more non-transitory memories (e.g., a non-transitory machine-readable media) or other type of hardware-based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, application specific integrated circuit (ASIC), microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry. Processing circuitry can include electric and/or electronic components. Electric and/or electronic components can include one or more transistors, resistors, capacitors, inductors, amplifiers, modulators, demodulators, antennas, radios, regulators, diodes, oscillators, multiplexers, logic gates, buffers, caches, memories, GPUs, CPUs, FPGAs, ASICs, or the like.

A container is a set of resources that operates on an operating system (or a guest operating system) to provide operations defined by a corresponding container image. Containers can run inside of VMs. Such operation can create a host with multiple OSs supporting multiple containers. The containers can thus share the physical resources without dependence on other applications using the OS.

An attack scenario involving the use of a container includes a malicious actor gaining access to a container (e.g., in the "Cloud") and using the container for a malicious (e.g., unintended or unauthorized) purpose, such as cryptocurrency mining, botnets, or the like. Embodiments herein can use crowd sourcing (e.g., from the Cloud) to learn the usual behavior of common containers deployed using common container images.

The Cloud is a global network of servers that are accessible through the Internet and provides a variety of hardware and software services. These servers are designed to either store and manage data, run applications, or deliver content or a service. Services can include streaming videos, web mail, office productivity software, or social media, among others. Instead of accessing files and data from a local or personal computer, Cloud data is accessed online from an Internet-capable device.

Embodiments can issue an alert in response to detecting an unexpected action. The embodiments can allow transfer of knowledge learned across entities. A certain entity (existing or new) using a container deployed based on the container image can be alerted when the container is executing and exhibiting unexpected behavior. The behavior being monitored can be learned based on actions of containers deployed using container images of other entities.

Figure 1:
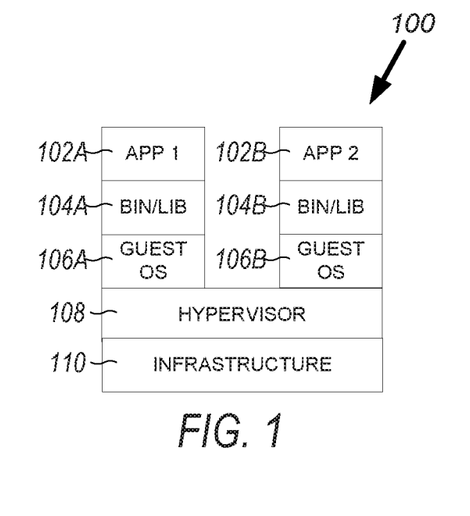
FIG. 1 illustrates, by way of example a high-level diagram of an embodiment of a virtual machine architecture.
Figure 2:
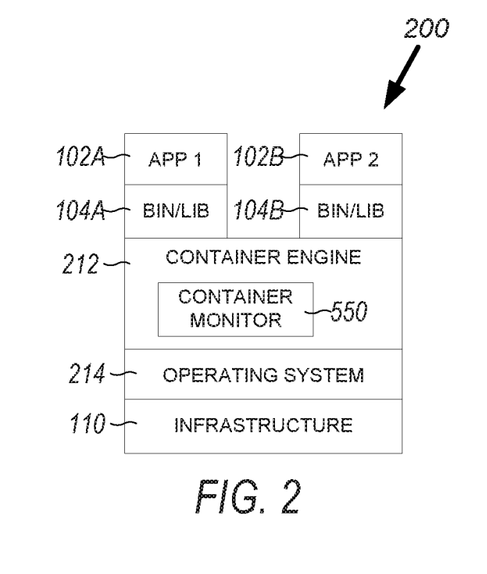
FIG. 2 illustrates, by way of example, a high-level diagram of an embodiment of a container architecture.

FIG. 1 illustrates, by way of example a high-level diagram of an embodiment of a virtual machine architecture 100. FIG. 2 illustrates, by way of example, a high-level diagram of an embodiment of a container architecture 200. These diagrams are provided for background understanding of containers and to highlight differences between virtual machines (VMs) and containers.

The VM architecture 100 as illustrated includes apps 102A, 102B, that depend on respective libraries 104A, 104B for operation. The apps 102A-102B operate on a respective guest operating system (OS) 106A, 106B. The guest OSs 106A-106B operate on a hypervisor 108. The hypervisor 108 can operate on a computer or network infrastructure 110. The guest OS 106A, library 104A, and app 102A form a VM that is virtualized by the hypervisor 108. Each VM includes a unique instance of an OS 106A-106B. Each VM includes its own binary ("bin") file(s), library file(s), and app(s) that it services. In general, the VM operating on the hypervisor 108 emulates a hardware system.

While the VM architecture 100 has benefits over applications operating on hardware, the VM architecture 100 also has drawbacks as compared to other application deployment architectures. For example, each VM consumes a prohibitively large amount of memory space. This is at least partially due to each OS 106A-106B operating on a respective VM. The boot time of a VM is prohibitively long due, at least partially, to booting the OS 106A-106B. VM download times are prohibitively long as well due, at least partially, to the data required for the OS 106A-106B. Other drawbacks of VMs are not specifically delineated here.

The container architecture 200 overcomes one or more of the drawbacks of the VM architecture 100. In the container architecture 200, the app 102A-102B uses libraries 104A-104B and operates on a container engine 212, sometimes called a runtime environment. The container engine 212 is hosted by an OS 214 that operates on the infrastructure 110. A container includes the app 102A-102B and the library 104A-104B, and other configuration files required to operate the app 102A-102B. The container is generally a deployment of a container image.

The container and image framework for application deployment currently has security drawbacks. For example, organizations currently monitor for fraudulent container images, and train users about best practices when they pull from public repositories. To help avoid the issue, an organization can create a limited list of available images. However, even with a limited set of available images, an actor with mal-intent can deploy a malicious image that, when deployed, operates for a malicious end. Other container security relies on digital signatures to help verify that an image file downloaded from a public repository is in an original state and unaltered. However, this added verification of authenticity does not prevent the creation or distribution of malware. Better security of containers is desired and beneficial.

Containers are distinct from legacy or traditional application deployments. In general, words such as "legacy" and "traditional" within the context of containers refer to infrastructure in which applications are executed directly on VMs or on bare servers. However, in using containers, VMs or bare-metal servers can be used. If an entity uses a container, there is still a host server or servers somewhere on which the container is operating. Those servers will generally be either VMs or bare-metal servers.

A difference between containerized infrastructure and legacy or traditional infrastructure is that in containerized infrastructure, a container environment sits between the host server (whether it is virtual or bare-metal) and the application operating in the container environment. A container runtime abstracts containerized applications away from the host server, providing more flexibility and simplifying configuration. Common types of applications operated in a container include a database server, an application server, a web server, electronic mail server, or the like.

Containerized applications start faster than VMs. This is because there is no need to boot an entire server to start a containerized application. The server is already running; it just needs to start a container to initialize the application. Containers can start in a few seconds, whereas it usually takes minutes to boot a VM or bare-metal server and then start an application on it.

Containerized applications are "denser" than traditional application deployment. More containerized applications can fit onto a single bare-metal server than using VMs operating the same applications. That is at least partially because containers do not require virtualizing a complete OS as is required by VMs. Since only the container environment needs to be run, a higher application density can be achieved.

Containerized applications are more scalable than traditional application deployment. The ability to start containers faster than legacy infrastructure leads to more scalability. If more instances of an application are needed, they can be started more quickly by spinning up new containers.

Container environments have fewer configuration variables. A container environment will look the same no matter which type of host OS it runs on, or the underlying hardware that supports it. This means there are fewer configuration variables to worry about when setting up and managing a container environment.

Figure 3:
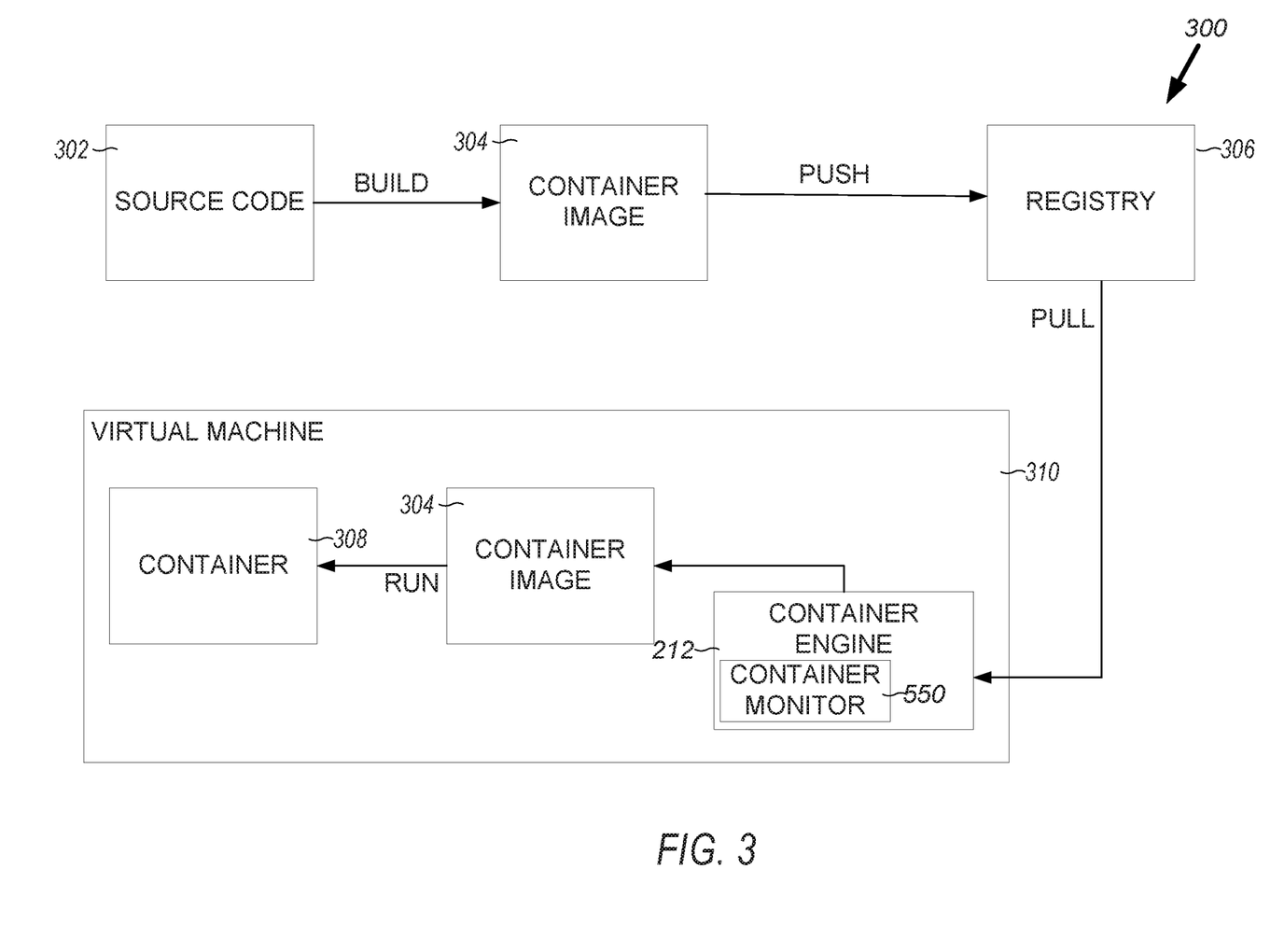
FIG. 3 illustrates, by way of example, a diagram of an embodiment of a container system.

FIG. 3 illustrates, by way of example, a diagram of an embodiment of a container system 300. The container system 300 as illustrated includes source code 302, a container image 304, a registry 306, a container 308 and a VM 310. A build of the source code 302 produces the container image 304. The VM 310 can include the guest OS 106A, 106B, the bin/lib 104A, 104B, and the application 102A, 102B, respectively, of FIG. 1.

The container image 304 is an unchangeable, static file that includes executable code that can be run as an isolated process on the container engine 212. A change to the container image 304 creates an instance of a new, different container image. The isolated process is the container 308. The container image 304 can include one or more system libraries 104A-104B (see FIG. 2), one or more system tools, and other platform settings the executable code needs to run as the container 308 on a platform. The container image 304 can share the OS 214 (see FIG. 2) of its host machine with other container images. This is one major difference between a container (a deployed instance of an image) and a virtual machine (VM). The VM uses its own OS instance to operate, while a container shares OS capability with other containers or other applications 102A-102B.

The container image 304 is built from file system layers built onto a parent or base image. These layers encourage reuse of various components, so the user does not create everything from scratch for every project.

Many software vendors create publicly available container images 304 of their products. For example. Microsoft Corporation of Redmond, Wash., United States of America (USA), offers a standardized query language (SQL) server container image. Container adopters need to be aware of the existence of corrupt, fake, and malicious publicly available container images 304, sometimes disguised to resemble official vendors' images.

In contrast to a VM, and as previously discussed, the container image format is designed to download quickly and start nearly instantly. The running container 308 generally consumes less compute and memory resources than a comparable VM running a same application.

The registry 306 is a service that stores container images 304. The container image 304 can be pushed to the registry 306 for storage or pulled from the registry 306 for deployment. For each container image 304, the registry includes an image identification. The container images are currently identified (in the registry 306) through the first 12 characters of an image identifier and have a virtual size measured in terms of distinct underlying layers. Container images 304 can be tagged (e.g., with a revision number or the like) or left untagged. Container images 304 can be searchable through the image identifier.

Typically, each container 308, which is a deployed instance of the container image 304, provides a single service (often called a "micro-service"), such as a web server or a database. A container 308 can be used for arbitrary workloads. The container 308 only has access to resources defined in the container image 304, unless the container 308 is given additional access when created.

The VM 310 can pull the container image 304 and run the container image 304 to deploy the container 308. The container engine 212 and container monitor 550 can be implemented in the VM 310.

While containers 308 are more isolated than traditional application deployments, they still have vulnerabilities. For example, a malicious actor can use a container for deploying applications to accomplish a variety of malicious ends, such as mining, botnets, unauthorized access, or the like.

Figure 4:
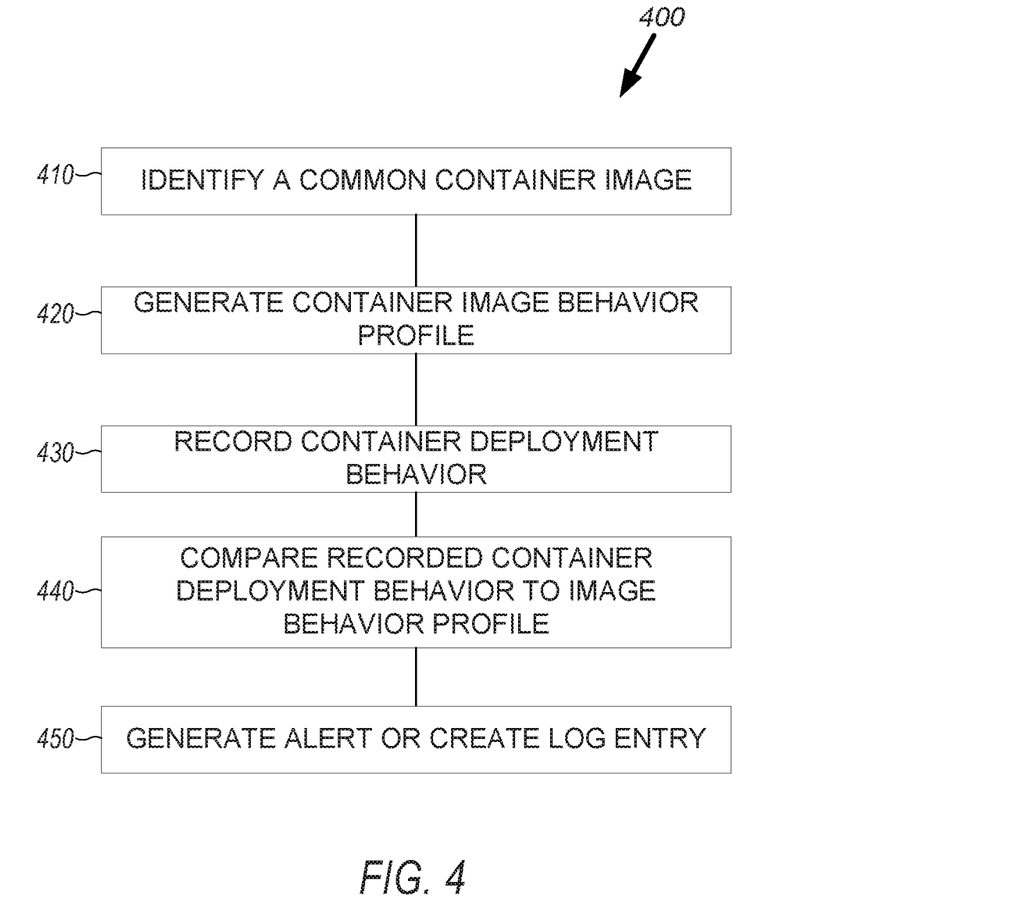
FIG. 4 illustrates, by way of example, a diagram of an embodiment of a method for identification of and response to anomalous container behavior.

FIG. 4 illustrates, by way of example, a diagram of an embodiment of a method 400 for identification of and response to anomalous container behavior. The method 400 as illustrated includes identifying a common container image, at operation 410; generating a container image behavior profile for the identified common container image, at operation 420; recording behavior of a container deployed using the common container image, at operation 430; comparing the recorded container deployment behavior to the generated container image behavior profile, at operation 440; and generating an alert or creating a log entry, at operation 450. The operation 450 can be performed in response to the comparison at operation 440 indicating the recorded container deployment is different from the image behavior profile generated at operation 420.

Container technology is widely used by many organizations of various sizes. Containers can be used on-premises at the organizations or accessed through a network. While some container images are common and used by many different organizations, others are not.

Crowd sourcing aggregates data from multiple users, organizations, or the like. Crowd sourcing techniques may not be sufficient for images that are less popular. This can be due, at least in part, to having a lack of data to generate a behavior profile at operation 420. Therefore, at the operation 410, a subset of container images 304 which are common or used often can be identified. Crowd sourcing can thus include performing operation 410. The operation 410 can include aggregating the data for the identified images.

The operation 410, can include consulting records of metrics indicating container image deployment volume, container image download volume, or the like. The metrics can be retrieved from a container image version control tool, such as Docker Hub, from Docker Inc. of San Francisco, Calif. United States, or other container image control tool. Other container platforms, besides Docker, include Rkt (short for Rocket), LXC (short for Linux Containers), Solaris Containers, and Open Virtuozzo (VZ), among others. The metrics can be at the container 308 level, container image 304 level or a combination thereof. The metrics can include a number of container image 304 deployments (e.g., containers 308), a number of downloads of a container image 304, a number of users that access the functionality of the container 308, a number of organizations that access or deploy the functionality of the container 308 or the container image 304, a combination thereof, or the like. The information can be provided by consulting the registry 306 or other data store with such container or container image data.

The operation 410 can include comparing the metrics to one or more thresholds to determine whether the container 308 or the container image 304 is in common use. In another example, a pre-defined number of container image deployments or users can be used as a rule that defines when a container image is considered common. In another example, a well-known image can be labelled as a common image and lesser known container images can be labelled as 'uncommon'. An ML classifier (e.g., linear regression, support vector machine (SVM), NN, or other classifier) can be trained on that data. The ML classifier can then be used to classify a container image 304 or container 308 as common or uncommon. Only common container images or common containers can be operated on at operation 420.

For example, a sample of N container images that are common and M container images that are in low use (total N+M container images). For each container image a feature vector can be generated. The feature vector can include information like number of container image downloads, number of users, age of the container image (how many days ago it was first seen), or another feature (e.g., property) that might indicate commonality. Then an ML model can be trained based on these feature vectors and their labels (common/uncommon). With the resulting output model, a feature vector can be assembled for other images and the model can identify whether the container image is common or uncommon. That is, the model can operate on a given feature vector and provide a prediction as to whether the image is common or uncommon.

The operation 420 can include expressing the normal behavior of the container image 304 (after deployment as the container 308). The normal behavior can include a statistically significant majority of the corresponding deployed containers 308 exhibiting the behavior.

Figure 5:
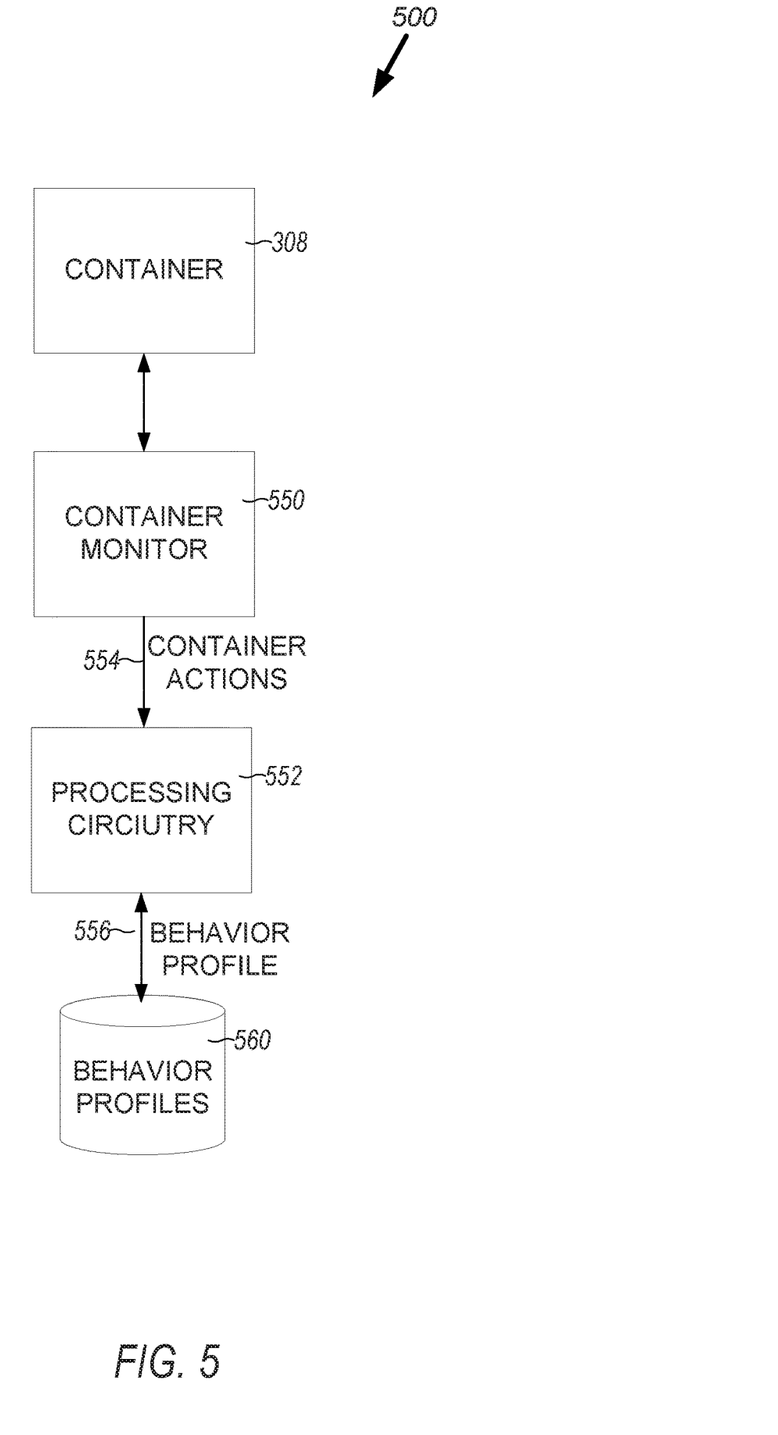
FIG. 5 illustrates, by way of example, a diagram of an embodiment of a system for generating a behavior profile (performing operations of FIG. 4).

FIG. 5 illustrates, by way of example, a diagram of an embodiment of a system 500 for generating a behavior profile 556. The system 500 can perform the operation 420. The behavior profile 556 can be generated by monitoring execution of the container 308. The monitored behavior can be associated with an identification that indicates the container image 304 from which the container 308 is deployed. The identification can correspond to the image identification, or a portion thereof, in the registry 306. In some embodiments, a container monitor 550 can be integral with the container 308, part of the container engine 212 (see FIG. 2), or part of another application or device operating on the OS 214 (see FIG. 2).

The container monitor 550 can record container actions 554 that occur within the container 308 or that access resources external to the container 308. The container actions 554 can include access of a port and a corresponding port number, an internet protocol (IP) address of a data request, a read or write to a process, executing a process, issuing or receiving a communication from another device, process bandwidth used, memory space allocated or consumed, time duration of or between specific operations, an output of an application executing in the container 308, or other container action.

The processing circuitry 552 can receive the container actions 554 and generate a behavior profile 556 based on the container actions 554. The behavior in the behavior profile 556 can include accessing a specific port, reading or writing to a port or process, executing a process, issuing or receiving a communication from another device, processor bandwidth used, memory space allocated or consumed, time duration between specific operations, communications, or port accesses, or the like. The behavior profile 556 of the container 308 can specify a behavior and, in some embodiments, a percentage of the total number of corresponding containers that exhibit the behavior. For some behaviors, a mean and deviation (e.g., standard deviation, variance, normal range, or the like) of all or a subset of the containers deployed for a specific container image 304 can be determined and used as part of the behavior profile 556. The behavior profile 556 of a container 308 can include one or more of the following entries:

[(port $x_0$, percentage), (port $x_1$, percentage), ... (port $x_{n-1}$, percentage)]
[(process $y_0$, percentage), (process $y_1$, percentage), ... (process $y_{n-1}$, percentage)]
[(comm. $z_0$, percentage), (comm. $z_1$, percentage), ... (comm. $z_{n-1}$, percentage)]
[(processor bandwidth, deviation)]
[(memory allocated, deviation)]
[(memory consumed, deviation)]
[(time between processes $y_0$ and $y_1$, deviation)]

One way to generate a profile is by defining profile's properties (used ports, executed processes, network communication, CPU bandwidth, memory bandwidth, communication bandwidth, or the like). The operation 420 can include determining statistical expected values and boundaries for one or more properties. For example, for a given image—20% of deployments are using only port 20 and 80% only port 21. This defines the expected value for that property. Other method is by using machine learning methods for example one class classifier model where the predictor knows to classify each new instance as belong to the class or not.

The operations 410 and 420 are part of the behavior profile generation and can be offline operations. The remainder of the operations 430, 440, and 450 are part of behavior monitoring and can be runtime operations.

The operations 410 and 420 can be performed periodically (e.g., daily, weekly, month, etc.) or by another trigger, such as a user request, memory usage, or the like. For example, every time a specified amount of new image data is uploaded to a cloud provider, after one hundred (100) new images are uploaded, or the like.

Figure 6:
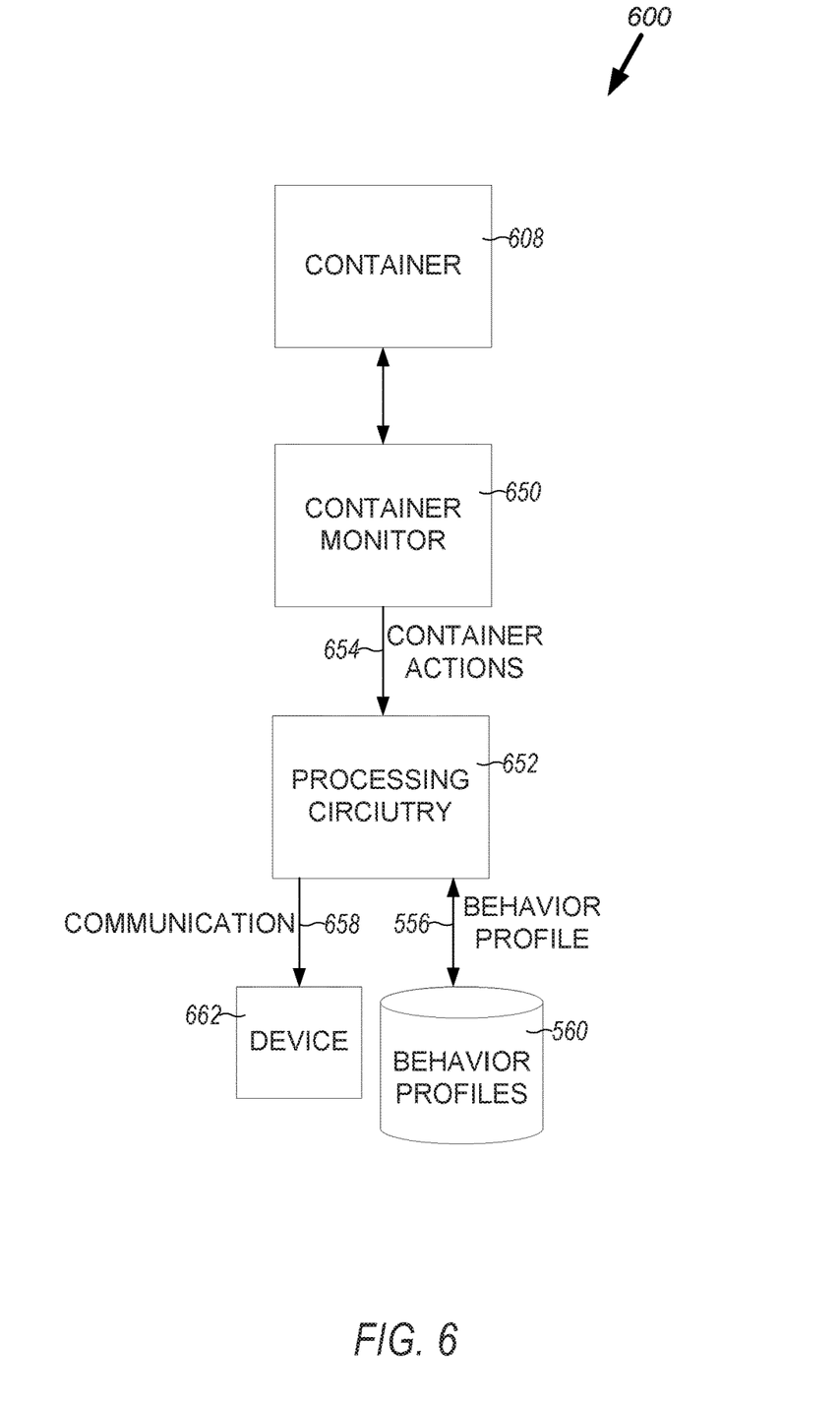
FIG. 6 illustrates, by way of example, a diagram of an embodiment of a system for behavior monitoring (performing operations of FIG. 4).

FIG. 6 illustrates, by way of example, a diagram of an embodiment of a system 600 for behavior monitoring (performing operations 430, 440, or 450). The system 600 as illustrated includes a deployed container 608, a container monitor 650, and processing circuitry 652.

The operation 430 can include using a container monitor 550 (e.g., the same or different container monitor as the one that recorded the container actions 554 used to generate the behavior profile 556) to recorded container actions 654 of a container 308 after the behavior profile 556 for the container 308 has been generated. The recorded container actions 654 can be provided to the processing circuitry 652 (same or different processing circuitry as generated the behavior profile 556).

The operation 440 can include filtering container actions 654 of an operating container 308 to include only types of behaviors that are in a corresponding behavior profile 556 for the container 308. For example, if a behavior profile 560 includes only a port access entry, the process calls, temporal data, and other behavior of the container actions 654 that are not port accesses can be filtered, such as by the processing circuitry 652. The filtering can reduce compute time and memory requirements for the comparison.

The operation 440 can include training an ML container classifier on properly operating containers at operation 420 and classifying container actions 654 from the container monitor 650 of a deployed container. The ML container classifier can be the behavior profile 560 for the container 308. The ML container classifier can return a label for container actions that indicates "normal" or "abnormal".

The operation 440 can include comparing container actions 654, or data derived from the container actions 654, to rules defining normal container behavior as defined in a corresponding behavior profile 556. The data derived from the container actions 654 can include time between actions, such as a time between a port access, a process execution, or the like. The data derived from the container actions 654 can include memory usage, processing circuitry bandwidth usage, or the like.

The operation 450 can include issuing an alert 658 to a device 662. The operation 450 can be performed in response to a determination, at operation 440, that the behavior of the container 308, as indicated by the container actions 654, is abnormal or breaks a rule as defined by the behavior profile 556. The alert 658 can include data uniquely identifying the container 308 that is subject of the alert, the container action(s) 654 that are considered abnormal, a time of the container action(s) 654, a location (e.g., server identification, geographical location (e.g., of a colocation center or the like), or the like) of the infrastructure 110 on which the container 608 is operating, or the like. The device 662 can be associated with a user in charge of maintaining the container 608. The device 662 can include a smartphone, computer, tablet, laptop, smartwatch, and the alert can include a text, phone call, a direct message communication, or other communication. In some embodiments, the device 662 can include an email server, or the like, through which a user can be notified by email or other communication.

The operation 450 can include blocking operation of a running container, auditing container actions to log or alert the customer. A user can configure their alert preferences for operation 450. For example, a user can indicate whether they want to block/unblock a container, be notified via email or text (e.g., simple messaging service (SMS)), be notified only on high confidence alerts, be notified of a maximum number of alerts per day or other time period or be notified only on images of a specified type, among other configuration options.

Figure 7:
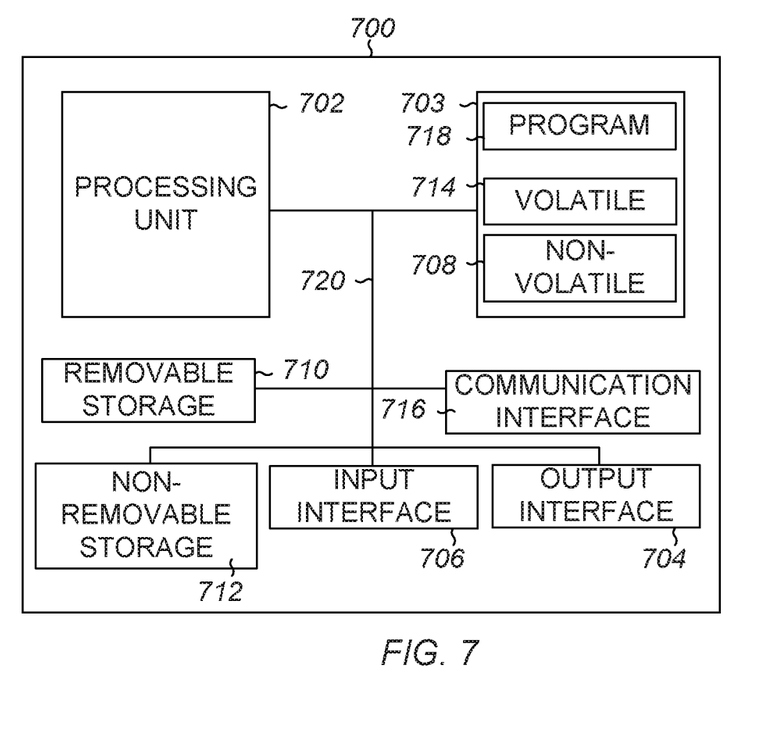
FIG. 7 illustrates, by way of example, a block diagram of an embodiment of a machine (e.g., a computer system) to implement one or more embodiments.

FIG. 7 illustrates, by way of example, a block diagram of an embodiment of a machine 700 (e.g., a computer system) to implement one or more embodiments. One example machine 700 (in the form of a computer), can include a processing unit 702, memory 703, removable storage 710, and non-removable storage 712. Although the example computing device is illustrated and described as machine 700, the computing device may be in different forms in different embodiments. For example, the computing device be part of a smartphone, laptop, desktop, tablet, smartwatch, or other computing device including the same or similar elements as illustrated and described regarding FIG. 7. One or more of the hypervisor 108, infrastructure 110, container engine 212, registry 306, container monitor 550, processing circuitry 552, container monitor 650, processing circuitry 652, device 662, or other component can be implemented using or include one or components of the machine 700. Further, although the various data storage elements are illustrated as part of the machine 700, the storage may also or alternatively include cloud-based storage accessible via a network, such as the Internet.

Memory 703 may include volatile memory 714 and non-volatile memory 708. The machine 700 may include— or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 700 may include or have access to a computing environment that includes input 706, output 704, and a communication connection 716. Output 704 may include a display device, such as a touchscreen, that also may serve as an input device. The input 706 may include one or more of a touchscreen, touchpad, mouse, keyboard, camera, one or more device-specific buttons, one or more sensors integrated within or coupled via wired or wireless data connections to the machine 700, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 702 of the machine 700. A hard drive, CD-ROM, and RAM are some examples of articles including a non-transitory computer-readable medium such as a storage device. For example, a computer program 718 may be used to cause processing unit 702 to perform one or more methods or algorithms described herein.

Some embodiments can be implemented using, at one or more operations, aspects of artificial intelligence (AI), including or processing and inferences performed using machine learning (ML) or neural networks (NNs). AI is a field of technology concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph-if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The correct operation of most NNs relies on accurate weights. However, NN designers do not generally know which weights will work for a given application. Instead, a training process (sometimes including ML) is used to arrive at appropriate weights. NN designers typically choose a number of neuron layers or specific connections between layers including circular connection. Instead, a training process generally proceeds by selecting initial weights, which may be specifically or randomly selected. Training data is fed into the NN and results are compared to an objective function that provides an indication of error. The error indication is a measure of how wrong the NN's result is compared to an expected result. This error is then used to correct the weights. Ove iterations, the weights can collectively converge to encode the operational data into the NN. This process may be called an optimization of the objective function (e.g., a cost or loss function), whereby the cost or loss is reduced or even minimized.

A gradient descent technique can be used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight can move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large or small step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

What follows is a description of Examples to help aid understanding of disclosed subject matter:

Example 1 includes a system comprising processing circuitry, and a memory device coupled to the processing circuitry, the memory device including instructions stored thereon for execution by the processing circuitry to perform operations for container monitoring, the operations comprising receiving, from a container monitor, container actions of an application operating in a deployed container, comparing the container actions to a behavior profile that indicates normal behavior of the container, and issuing a communication in response to the container actions being inconsistent with the normal behavior of the behavior profile.

In Example 2, Example 1 further includes, wherein the behavior profile includes data indicating a port number of a port accessed by an application within the container and the container actions indicate a port number of a port accessed by the application in the container.

In Example 3, at least one of Examples 1-2 further includes, wherein the behavior profile includes data indicating a process called by an application in the container.

In Example 4, at least one of Examples 1-3 further includes, wherein the behavior profile includes data indicating an action performed by an application of the container and a percentage indicating a number of containers built from a same container image that exhibit the behavior.

In Example 5, at least one of Examples 1-4 further includes, wherein the operations further include generating the behavior profile of the container.

In Example 6. Example 5 further includes, wherein generating the behavior profile includes analyzing container actions from multiple container instances built from a same container image and recording container actions that are performed among the multiple container instances.

In Example 7, at least one of Examples 1-6 further includes, wherein the operations further include filtering container actions associated with container action types that are not in the behavior profile before comparing the container actions to the behavior profile.

Example 8 includes at least one machine-readable storage medium including instructions for execution by processing circuitry to perform operations for container monitor, the operations comprising comparing container actions of an application in a deployed container to a behavior profile that indicates normal behavior of the container and issuing a communication in response to the container actions being inconsistent with the normal behavior of the behavior profile.

In Example 9, Example 8 further includes, wherein the behavior profile includes data indicating a port number of a port accessed by an application within the container and the container actions indicate a port number of a port accessed by the application in the container.

In Example 10, at least one of Examples 8-9 further includes, wherein the behavior profile includes data indicating a process called by an application in the container.

In Example 11, at least one of Examples 8-10 further includes, wherein the behavior profile includes data indicating an action performed by an application in the container and a percentage indicating a number of containers built from a same container image that exhibit the behavior.

In Example 12, at least one of Examples 8-11 further includes, wherein the operations further include generating the behavior profile of the container.

In Example 13, Example 12 further includes, wherein generating the behavior profile includes analyzing container actions from multiple container instances built from a same container image and recording container actions that are performed among the multiple container instances.

In Example 14, at least one of Examples 8-13 further includes, wherein the operations further include filtering container actions associated with container action types that are not in the behavior profile before comparing the container actions to the behavior profile.

Example 15 includes a method of container performance monitoring performed by at least one processor, the method comprising generating a behavior profile of an application operating in a deployed container based on multiple instances of the deployed container, receiving, from a container monitor, container actions of an application operating in the deployed container, comparing the container actions to the generated behavior profile, and issuing a communication in response to the container actions being inconsistent with the normal behavior of the behavior profile.

In Example 16, Example 15 further includes, wherein the behavior profile includes data indicating a port number of a port accessed by an application within the container and the container actions indicate a port number of a port accessed by the application in the container.

In Example 17, at least one of Examples 15-16 further includes, wherein the behavior profile includes data indicating a process called by an application in the container.

In Example 18, at least one of Examples 15-17 further includes, wherein the behavior profile includes data indicating an action performed by an application of the container and a percentage indicating a number of containers built from a same container image that exhibit the behavior.

In Example 19, at least one of Examples 15-18 further include, wherein the operations further include filtering container actions associated with container action types that are not in the behavior profile before comparing the container actions to the behavior profile.

In Example 20, at least one of Examples 15-19 further include, wherein comparing the container actions to the behavior profile includes generating a feature vector based on the container actions and generating, using a machine learning classifier trained on normal container actions, a label indicating whether the application in the container is operating inconsistent with the normal container actions based on the feature vector.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A system comprising:
   processing circuitry; and
   a memory device coupled to the processing circuitry, the memory device including instructions stored thereon for execution by the processing circuitry to perform operations for container monitoring, the operations comprising:
      identifying respective container images that have more than a specified amount of usage and less than a specified amount of usage resulting in identified common container images and identified uncommon container images, respectively, the amount of usage indicating a total number of deployments, total number of organizations that have deployed a container image of the container images, and a number of users of the container image;
      receiving, from a container monitor, container actions of an application operating in a container deployed using an identified common container image of the identified common container images;
      comparing the container actions to a behavior profile that indicates normal behavior of the container; and
      issuing a communication in response to the container actions being inconsistent with the normal behavior of the behavior profile.

2. The system of claim 1; wherein the behavior profile includes data indicating a first port number of a first port accessed by an application within the container and the container actions indicate a second port number of a second port accessed by the application in the container.

3. The system of claim 1, wherein the behavior profile includes data indicating a process called by an application in the container.

4. The system of claim 1, wherein the behavior profile includes data indicating an action performed by an application of the container and a percentage indicating a number of containers built from a same container image that exhibit the behavior.

5. The system of claim 1, wherein the operations further include generating the behavior profile of the container.

6. The system of claim 5, wherein generating the behavior profile includes analyzing container actions from multiple container instances built from a same container image and recording container actions that are performed among the multiple container instances.

7. The system of claim 1, wherein the operations further include filtering container actions associated with container action types that are not in the behavior profile before comparing the container actions to the behavior profile.

8. At least one machine-readable storage medium including instructions for execution by processing circuitry to perform operations for container monitoring, the operations comprising:
   identifying respective container images that have more than a specified amount of usage and less than a specified amount of usage resulting in identified common container images and identified uncommon container images, respectively, the amount of usage indicating a total number of deployments, total number of organizations that have deployed a container image of the container images, and a number of users of the container image;
   receiving, from a container monitor, container actions of an application operating in a container deployed using an identified common container image of the identified common container images;
   comparing container actions of an application in a deployed container to a behavior profile that indicates normal behavior of the container; and
   issuing a communication in response to the container actions being inconsistent with the normal behavior of the behavior profile.

9. The at least one machine-readable medium of claim 8, wherein the behavior profile includes data indicating a first port number of a first port accessed by an application within the container and the container actions indicate a second port number of a second port accessed by the application in the container.

10. The at least one machine-readable medium of claim 8, wherein the behavior profile includes data indicating a process called by an application in the container.

11. The at least one machine-readable medium of claim 8, wherein the behavior profile includes data indicating an action performed by an application in the container and a percentage indicating a number of containers built from a same container image that exhibit the behavior.

12. The at least one machine-readable medium of claim 8, wherein the operations further include generating the behavior profile of the container.

13. The at least one machine-readable medium of claim 12, wherein generating the behavior profile includes analyzing container actions from multiple container instances built from a same container image and recording container actions that are performed among the multiple container instances.

14. The at least one machine-readable medium of claim 8, wherein the operations further include filtering container actions associated with container action types that are not in the behavior profile before comparing the container actions to the behavior profile.

15. A method of container performance monitoring performed by at least one processor, the method comprising:
   identifying respective container images that have more than a specified amount of usage and less than a specified amount of usage resulting in identified common container images and identified uncommon container images, respectively, the amount of usage indicating a total number of deployments, total number of organizations that have deployed a container image of the container images, and a number of users of the container image;

generating a behavior profile of an application operating in a deployed container based on multiple instances of the deployed container, the generated behavior profile indicating normal behavior of the application;

receiving, from a container monitor, container actions of an application operating in the container deployed using an identified common container image of the identified common container images;

comparing the container actions to the generated behavior profile; and issuing a communication in response to the container actions being inconsistent with the normal behavior of the behavior profile.

16. The method of claim 15, wherein the behavior profile includes data indicating a first port number of a first port accessed by an application within the container and the container actions indicate a second port number of a second port accessed by the application in the container.

17. The method of claim 15, wherein the behavior profile includes data indicating a process called by an application in the container.

18. The method of claim 15, wherein the behavior profile includes data indicating an action performed by an application of the container and a percentage indicating a number of containers built from a same container image that exhibit the behavior.

19. The method of claim 15, wherein the operations further include filtering container actions associated with container action types that are not in the behavior profile before comparing the container actions to the behavior profile.

20. The method of claim 15, wherein comparing the container actions to the behavior profile includes generating a feature vector based on the container actions and generating, using a machine learning classifier trained on normal container actions, a label indicating whether the application in the container is operating inconsistent with the normal container actions based on the feature vector.

* * * * *